United States Patent [19]
Hussey

[11] Patent Number: 5,264,877
[45] Date of Patent: Nov. 23, 1993

[54] EYEGLASSES FOR USE IN THE TREATMENT/DIAGNOSIS OF CERTAIN MALFUNCTIONS OF THE EYE

[76] Inventor: Eric S. Hussey, N. 10511 Middleton Dr., Spokane, Wash. 99218

[21] Appl. No.: 636,550

[22] Filed: Jan. 4, 1991

Related U.S. Application Data

[63] Continuation of Ser. No. 385,655, Jul. 27, 1989, abandoned.

[51] Int. Cl.⁵ ............................................. G02C 7/16
[52] U.S. Cl. .................................... 351/45; 351/44; 351/158
[58] Field of Search .................... 351/44, 45, 47, 158, 351/201, 203

[56] References Cited

U.S. PATENT DOCUMENTS

| | | | |
|---|---|---|---|
| 4,531,814 | 7/1985 | Ballmer | 351/44 |
| 4,698,564 | 10/1987 | Slavin | 351/203 |
| 4,756,605 | 7/1988 | Okada et al. | 351/44 |
| 4,907,860 | 3/1991 | Noble | 351/203 |

*Primary Examiner*—Bruce Y. Arnold
*Assistant Examiner*—Hung Xuan Dang
*Attorney, Agent, or Firm*—Jensen & Puntigam

[57] ABSTRACT

The article includes an eyeglass frame (12) and two lenses (14, 16). Each lens has a film (18,20) on one surface thereof which is changeable between an opaque condition and a transparent condition, controlled by an electrical circuit (22).

7 Claims, 2 Drawing Sheets

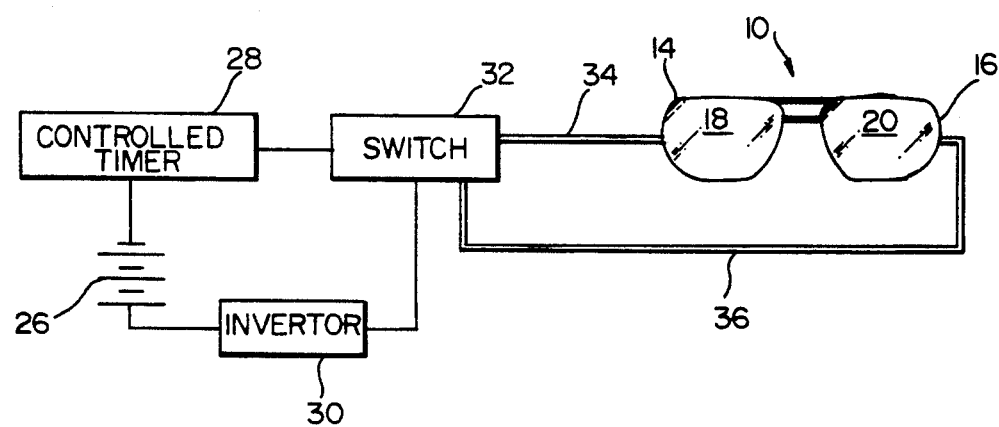

EYEGLASSES FOR USE IN THE TREATMENT/DIAGNOSIS OF CERTAIN MALFUNCTIONS OF THE EYE

CROSS-REFERENCE TO RELATED APPLICATION

This is a continuation of application Ser. No. 385,655, filed on Jul. 27, 1989 now abandoned.

TECHNICAL FIELD

This invention relates generally to the optometry art, and more specifically concerns an article for treatment/diagnosis of certain malfunctions of the eye, in particular the phenomenon of suppression.

BACKGROUND OF THE INVENTION

At least two significant eye malfunctions, strabismus (crossed-eye) and amblyopia (lazy eye), involve the phenomenon of suppression, which is a sensory malfunction in which one of the eyes in effect is "blind" although it has the capacity for vision. The vision in the crossed or lazy eye is suppressed so that it does not interfere with the "good" eye. Typically, the suppression in strabismus and amblyopia is constant. In other cases, not involving strabismus or amblyopia, one or both eyes may be suppressed intermittently, which is referred to generally as intermittent central suppression (ICS). ICS occurs at various rates and for various time intervals, typically in the range of 12 to 60 times per minute.

The treatment of constant suppression involves the correction of the crossed or lazy eye so as to make them, in effect, normal in function and appearance, thereby providing the total visual benefit of both eyes (binocular vision). While the effect of constant suppression on vision is known (one eye is in effect blind), the effects of ICS are less well known. Presumably there is some effect on binocular vision. There is also a strong possibility that certain visually mediated functions, in particular reading, are detrimentally affected by ICS. It has been suggested that the intermittent "switching off" of vision in one eye due to ICS results in the intermittent obscuring of the text material being read, so that reading becomes difficult because the same words may look different depending upon whether suppression is present or not, i.e. the timing of the ICS.

While malfunctions such as strabismus and amblyopia are relatively easy to diagnose, the accurate diagnosis of ICS is more difficult. There are a number of tests which have been used for ICS, most of which, however, have proven to be unreliable in the accurate diagnosis of ICS.

One of the traditional treatments used to correct suppression involves the use of binocular devices such as prisms and stereoscopes which in effect force each eye to see a separate portion of a "complete" image. The two partial images are then integrated by the brain to produce a complete image. Each image path can be alternately lighted in order to stimulate each eye separately. Light flashers which impinge directly upon the eye have also been used. However, the significant disadvantage to such a treatment approach is that the treatment can only be accomplished in a practitioner's office, because of the equipment necessary. Such treatment is thus inherently time limited. While improvement in the suppression condition is often possible with such treatment, frequently it is relatively slow and not reliable.

Another common technique for treatment of suppression is patching of the suppressed eye. While typically an effective technique, the appearance presented by an eye patch is usually so undesirable that only a small part of the population, i.e. very young children, will wear a patch for an extended period of time. Hence, patching is not perceived to be practical for the general population.

In at least one condition, i.e. strabismus, surgery can be used as a last resort to prevent the eye from crossing. In amblyopia, as in ICS, however, there is no real need for surgery, and thus the individual with those conditions is left to tolerating either the lack of true binocular vision, in the case of amblyopia, or the disadvantages of intermittent suppression, such as reading difficulties and intermittent loss of binocular vision.

Hence, there is a demonstrated need, longstanding in the art, for an effective and reliable treatment for the suppression phenomenon, both constant and for ICS, as well as more recently, a need to accurately diagnose the existence of intermittent central suppression (ICS).

DISCLOSURE OF THE INVENTION

Accordingly, the present invention is an article for treatment and/or diagnosis of certain eye malfunctions, including eyeglasses having at least one lens which is treated so as to be changeable between a generally opaque condition and a generally transparent condition, under the control of an electric signal and means for producing an electric signal capable of switching the treated lens between its opaque and transparent conditions and for applying the electric signal to the treated lens at a selected rate.

BRIEF DESCRIPTION OF THE DRAWINGS

FIG. 3 is a block diagram of the electrical control circuit of the present invention.

BEST MODE FOR CARRYING OUT THE INVENTION

Figure 1:
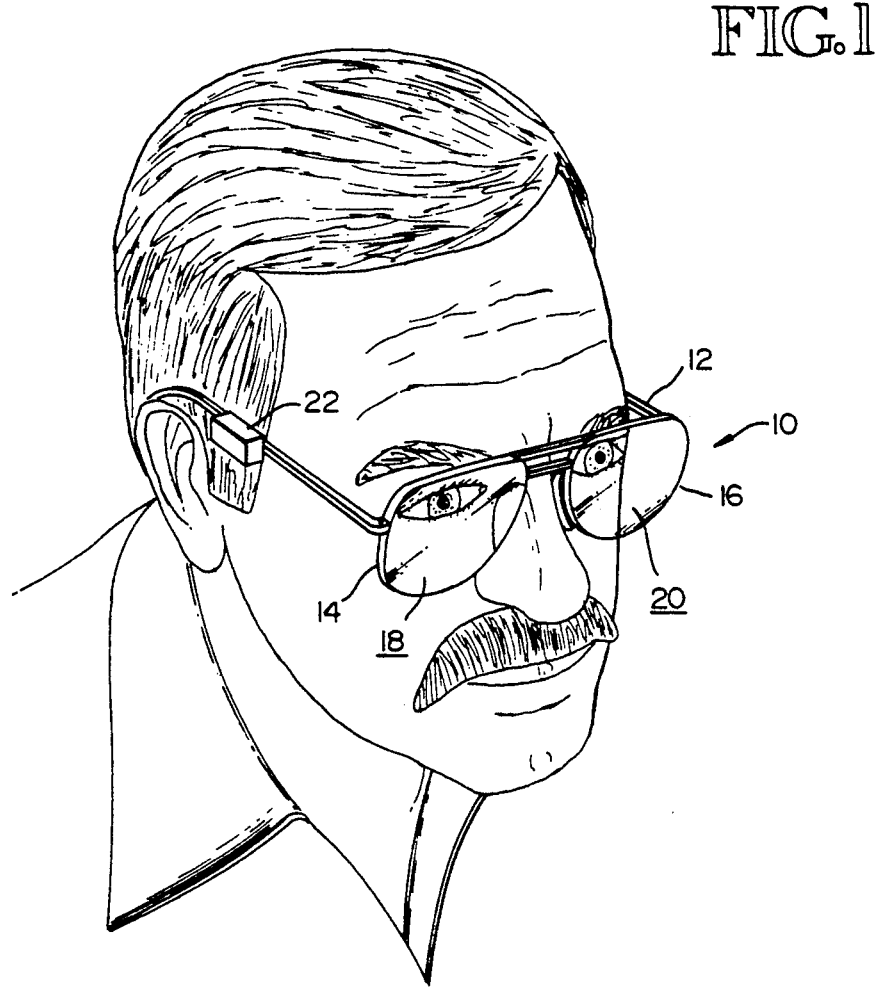
FIG. 1 is a representational view showing the article of the present invention in place on an individual user.

FIG. 1 shows the article of the present invention in a schematic or representational form in place on an actual user. The article comprises treated eyeglasses which are electrically controlled to produce alternating opaque, i.e. occluded (dark) and transparent (clear) conditions in the two lenses. The article is shown generally at 10, and includes a conventional eyeglass frame 12 with two lenses 14 and 16. The lenses themselves may either be clear glass or may have conventional correction for nearsightedness, farsightedness or other conditions. Also, the lenses could be tinted, if desired.

The front surface of each lens 14 and 16 is coated with a thin film 18, 20 which is responsive to an electrical signal to switch, i.e. change, between an opaque state in which vision through the lens is partially or completely prevented, and a clear or transparent state in which there is no interference with the vision through the lens.

This film 18, 20 will be explained in more detail in the following paragraphs, as will be the electrical circuit, shown generally at 22, which controls the state of the film on each lens. While circuit 22, which contains a battery and a signal-generating portion, is shown in general block form in FIG. 1 as part of the glasses frame, similar to those glasses which incorporate a hearing aid, it should be understood that control circuit 22 could be separate from the glasses themselves and could be attached to the ear in some fashion or contained in a small unit adapted to be carried by the user, such as in a chest pocket. In such a case, electrical leads would extend from the eyeglass frame to the circuit.

In the embodiment shown, the film layers 18 and 20 consist of a thin interior (3–15 mils) layer of electro-optical liquid crystals between adjacent exterior layers of metalized mylar. The film is commercially available; for example, the product, currently marketed under the name "translight", is available from Linear Optics Company. When the film is not electrically stimulated, i.e. when an electrical potential is not applied (the "off" state), the film will scatter any light which impinges thereon, giving it a cloudy, somewhat whitish, appearance. In the off state, vision is prevented by the opaque film. Different color films are readily possible, as well as different tints, which may in themselves be useful in treating other eye conditions. Colored films may help in making the switching between opaque and transparent conditions less noticeable, as well as possibly having desirable treatment effects. Also, the degree of light scattering can be varied so that a partial occlusion can be obtained, if desired. Still further, it is possible to cover only a portion of the lenses with the film.

Upon the application of an electrical signal, in the range of 30–60 VAC for the specific film material described above, an electric field is established between the metalized mylar conductors, having the effect of aligning the liquid crystals, and resulting in the film becoming transparent. This is the "on" state for the lens.

Figure 2:
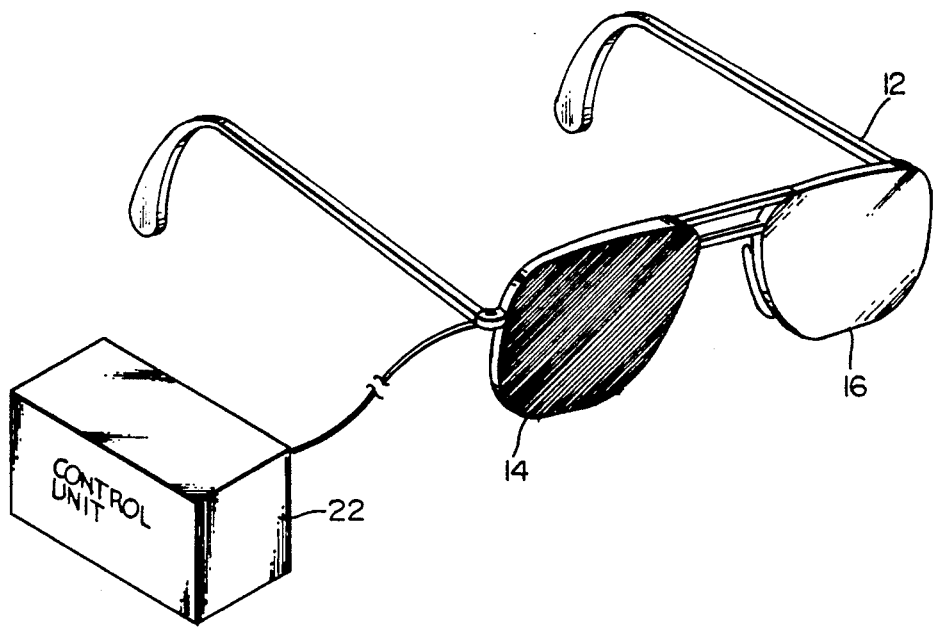
FIG. 2 is a schematic view showing the article of the present invention in an operating condition with one lens opaque and the other transparent.

Referring to FIG. 2, lens 14, which is opaque, has no electrical potential applied thereto, and is therefore off, while lens 16 does have an electric potential applied to it, resulting in the film becoming transparent, as shown, and is therefore on.

The film has relatively low power requirements, i.e. 1/10 watt per square foot. The required switching time is approximately 1 millisecond from off to on (to transparent), and approximately 25 milliseconds from on to off (to opaque). These switching times are sufficiently fast for the required frequencies described above to accomplish the treatment/diagnosis of suppression.

The control circuit for the present invention is shown in FIG. 3. It includes a conventional 9-volt battery 26, which is connected to a controlled timer 28 as well as an inverter 30. The timer 28 controls the frequency of the change of lens condition and the frequency may be either adjustable or fixed, depending upon the particular application of the glasses. The outputs of the timer 28 and inverter 30 are applied to a switch 32. The output of switch 32 is applied through electrical leads 34 to the film 18 on one lens 14, and through leads 36 to the film 20 on lens 16. When the battery 26 is on, switching will occur at a predetermined rate. Although the circuit is designed to provide a relatively wide frequency range, in the embodiment shown, the typical frequency for treatment of suppression will be in the range of 6–15 Hz with the most desirable rate being approximately 7 Hz, while for diagnosis of ICS the frequency will be within the range of 4–120 cycles per minute.

It should also be understood that the two lenses of the eyeglasses of the present invention can be individually controlled so as to alternate between opaque and transparent conditions in such a manner that when one lens is in its opaque condition, the other is in its transparent condition and vice versa.

Hence, an article has been disclosed which takes the form of specially treated eyeglasses, operative such that the eyeglass lenses alternate between opaque and transparent conditions, at a selected frequency. The glasses are effective in the treatment of suppression, and may be conveniently worn by the user for extended periods of time.

Although a preferred embodiment of the invention has been disclosed herein for illustration, it should be understood that various changes, modifications and substitutions may be incorporated in such embodiment without departing from the spirit of the invention which is defined by the claims which follow.

I claim:

1. An article for treatment/diagnosis of eye malfunctions, comprising:

eyeglasses adapted specifically for treatment/diagnosis of eye malfunctions of a user, the eyeglasses being free of connection to any object external to the user and having at least one lens which is treated so at least a portion thereof is changeable from an opaque condition to a transparent condition under the control of an electric signal;

a source of electrical energy carried on the eyeglasses or the user, the electrical energy being capable of changing the condition of said lens between opaque and transparent when applied thereto; and an electrical control circuit carried on the eyeglasses or the user, said electrical control circuit, in combination with said source of electrical energy, producing an electrical control signal and applying said signal to said lens at a preselected repetitive rate which is useful in the treatment/diagnosis of eye malfunctions, the preselected repetitive rate being within at least one of ranges (a) 4–120 cycles per minute and (b) 6–15 Hz, such that the condition of said lens changes between opaque and transparent at said preselected repetitive rate.

2. An article of claim 1, wherein the lens includes a film which is changeable between said opaque and transparent conditions.

3. An article of claim 2, wherein said film is colored.

4. An article of claim 2, wherein the eyeglasses have two lenses, one for each eye, wherein each lens includes said film, the two lenses alternating between the opaque and transparent conditions such that when one lens is in its opaque condition, the other is in its transparent condition and vice versa.

5. An apparatus of claim 1, wherein said control circuit includes means for varying the preselected repetitive rate within both of said ranges.

6. A method for treatment/diagnosis of eye malfunctions in a patient, using eyeglasses, comprising the steps of:

placing eyeglasses on a patient to be treated/diagnosed for eye malfunctions, in which the eyeglasses are free of connection to any object external to the user and have at least one lens which is treated so at least a portion thereof is changeable from an opaque condition to a transparent condition; and automatically changing the condition of said lens by means of an electrical control circuit carried on the eyeglasses or the patient between opaque and transparent at a preselected repetitive rate which is useful in the treatment/diagnosis of eye malfunctions, said preselected repetitive rate being within at least one of ranges (a) 4–120 cycles per minute and (b) 6–15 Hz.

7. A method of claim 6, wherein the eyeglasses have two lenses, one for each eye, and wherein the two lenses alternate between opaque and transparent conditions such that when one lens is in an opaque condition, the other is in a transparent condition and vice versa.

* * * * *